United States Patent [19]

Waehner

[11] Patent Number: 4,951,143
[45] Date of Patent: Aug. 21, 1990

[54] MEMORY CONFIGURATION FOR UNSYNCHRONIZED INPUT AND OUTPUT DATA STREAMS

[75] Inventor: Glenn C. Waehner, New Canaan, Conn.

[73] Assignee: American Dynamics Corporation, Orangeburg, N.Y.

[21] Appl. No.: 356,192

[22] Filed: May 24, 1989

[51] Int. Cl.[5] .......................... H04N 5/14; H04N 5/95
[52] U.S. Cl. .................................... 358/160; 358/148; 358/337; 360/36.2
[58] Field of Search ...................... 358/21 R, 148, 160, 358/320, 325, 337, 339; 360/36.1, 36.2

[56] References Cited

U.S. PATENT DOCUMENTS

| | | | |
|---|---|---|---|
| T964,004 | 11/1977 | Davy | 360/36.2 |
| 4,101,929 | 7/1978 | Dischert et al. | 358/148 |
| 4,178,607 | 12/1979 | Mikado | 358/320 |
| 4,373,168 | 2/1983 | Mizukami et al. | 358/19 |
| 4,415,994 | 11/1983 | Ive et al. | 365/189 |
| 4,438,456 | 3/1984 | Yoshinaka | 358/148 |
| 4,688,111 | 8/1987 | Kani | 360/36.2 |
| 4,716,454 | 12/1987 | Oldershaw et al. | 358/320 |
| 4,780,770 | 10/1988 | Wagner | 360/36.1 |
| 4,862,269 | 8/1989 | Sonoda et al. | 358/148 |

Primary Examiner—John W. Shepperd
Assistant Examiner—Michael D. Parker
Attorney, Agent, or Firm—Peter L. Michaelson

[57] ABSTRACT

Circuitry is disclosed for regenerating a digital output stream referenced to an output timing signal from a digital input stream referenced to an input timing signal wherein the input and output timing signals are typically unsynchronized. Both the digital input stream and a delayed version of the input stream alternately serve as inputs to a dual-port memory. The output port of the memory emits the output stream under control of the output timing signal. Whenever the output stream is being transferred from the dual-port memory to an output buffer, the storing of data through the input port of the memory is temporarily suspended. In order to ensure that no input data is lost, the delayed input stream is presented to the memory after interrupt of the memory by the output timing signal. Prior to the interruption, the input port receives its input directly from the input stream. The delay interval is chosen to be commensurate with the output timing signal to preserve data input into the memory.

16 Claims, 5 Drawing Sheets

MEMORY CONFIGURATION FOR UNSYNCHRONIZED INPUT AND OUTPUT DATA STREAMS

FIELD OF THE INVENTION

This invention relates generally to a data processing system and, more particularly, to circuitry for producing an output data stream from an input data stream wherein the input and output streams have different time references.

BACKGROUND OF THE INVENTION

In video surveillance situations, it is oftentimes desirable to monitor a number of remote locations, such as entrances/exits of a building or stations along a production line, from a centralized monitoring location. For these situations, separate video cameras are stationed at each respective location to produce a view of the monitored location. If the view on each camera changes slowly, it is possible to use a single monitor to display on a time-shared basis the images produced by the cameras. To reduce system complexity and thereby mitigate operational expenses, the cameras operate asynchronously. Moreover, because the monitor is being switched from camera to camera, the monitor is also generally only synchronized with the camera image being displayed thereon.

With the introduction of advanced digital processing techniques, the video pictures generated by the cameras are processed digitally in order to store or resynchronize the image. Consequently, digital memories having large storage capacity and high input and output data rates are required. However, large memories with fast data rates are generally costly. Moreover, if the video source is not synchronized to the digital system output, as is the case in certain surveillance applications, then the memories must be operated in their slower random access mode rather than their faster page mode. In page mode, reading from the output of the memory may occur simultaneously with writing to the input of the memory. This occurs because as output samples are read out, input samples may overwrite the output sample locations at the same rate. Impliedly then the input and output must be synchronized. Random access mode is slower because, in addition to a read/write interval, an access interval is required to position the memory pointer to the desired location. This random mode accommodates asynchronous operation of camera and monitor since it is necessary to access different areas in memory in order to store picture element (pixel) data representative of the video input signal and to extract other pixel data for display on the monitor.

One conventional way to increase image resolution even for unsynchronized input and output video signals is to utilize a dual-port RAM circuit. With such a circuit, the picture data required to construct the video signal for the monitor is read from one port of the RAM whereas the pixel data produced by a given camera serves as the input for the other port. Such a memory has a deleterious property, inasmuch as the input and output ports are not completely independent of one another. Each must be interrupted periodically to effect a data transfer. In asynchronous applications, this transfer will cause an unwritten or unread region in one of the images and, accordingly, a distorted output image on the monitor. Conventionally, one way to overcome this effect is to provide two large, high-speed memories, with one serving to store input samples and the other to store output samples. Appropriate areas of memory may be transferred from one memory to the other during blanking intervals. However, implementing a system with two full memories can be costly and introduces an added degree of complexity.

SUMMARY OF THE INVENTION

These shortcomings and limitations are obviated in accordance with the present invention, by configuring a digital regeneration system to delay data input during output data processing intervals so as to preserve the integrity of the input data.

Broadly, the system comprises a cascade combination of a delay device, a selector and a dual-port memory. The output of the delay device is a delayed version of an input stream. Both the input data stream and the delayed stream serve as inputs to the selector. The selector is controlled to route the input data stream to the input port of the memory during an initial processing phase. When a data output request is received by the memory, the selector is switched so as to connect the delayed input to the memory. Then, after the output data is emitted from the memory output port, the input port is again activated to receive the delayed stream. If the delay and output processing interval are commensurate, no input data is lost by servicing the output data interrupt request.

In an illustrative embodiment of the present invention applied to an image processing situation, a digital video reconstruction system is arranged with a single large main memory and a small buffer memory and configured for the generation of two types of samples, namely, actual samples and delayed versions of the actual samples, so that one or the other may be loaded into the main memory. The samples to be loaded depend upon the data transfer request status of the main memory output port which provides a subset of samples stored in the main memory to the buffer memory.

BRIEF DESCRIPTION OF THE DRAWING

The organization and operation of this invention will be better understood by considering the following detailed description of the illustrative embodiments thereof in conjunction with the accompanying drawing, in which.

To facilitate understanding, identical reference numerals have been used, where possible, to denote similar elements that are common to the figures.

DETAILED DESCRIPTION

Figure 1:
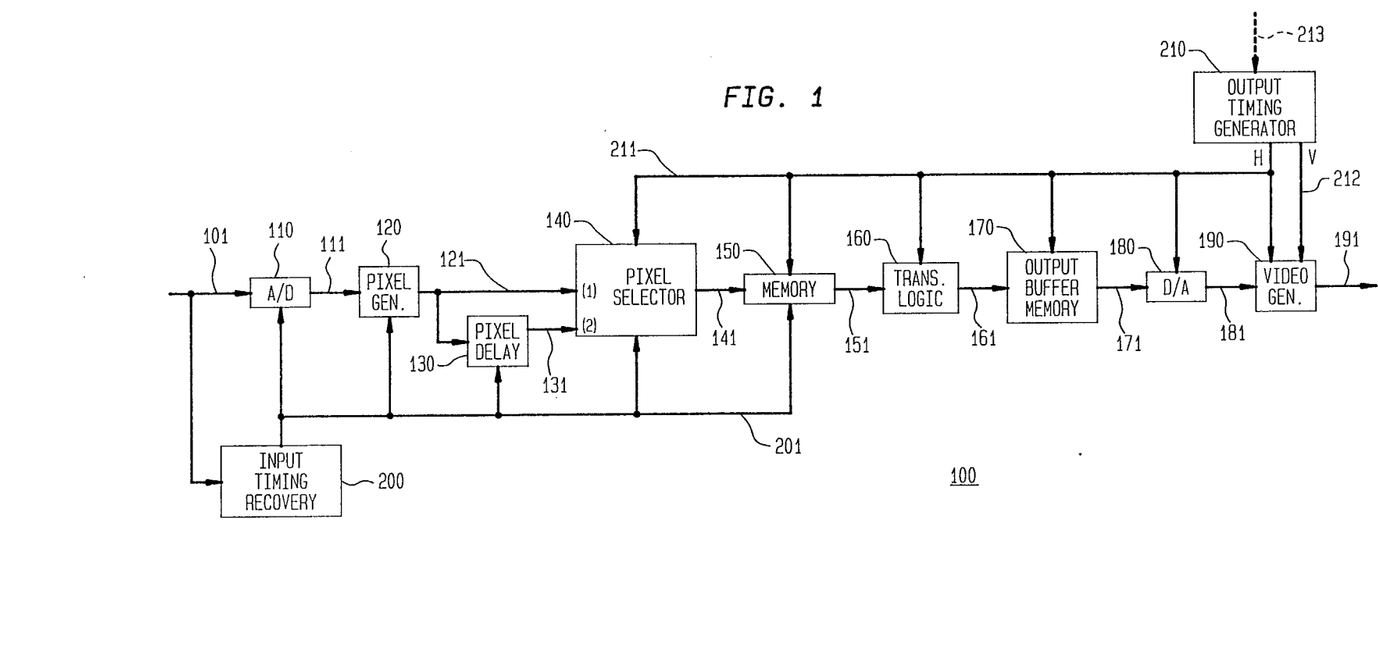
FIG. 1 is a schematic diagram of the overall video processing circuitry fabricated in accordance with the present invention.

The initial discussion focuses on system 100 of FIG. 1 as being illustrative of the aspects of the present invention as applied to video system 100. This discussion allows for the introduction of notation and terminology in preparation for elucidating the most general aspects of the present invention.

With respect to FIG. 1, the discussion commences by describing the manner in which memory 150 is loaded with pixel data assuming that output timing generator 210 is not activated. Accordingly, a standard video signal appearing on lead 101, complete with horizontal and vertical synchronizing signals, serves as the input to both input timing recovery circuit 200 and A/D converter 110. Timing circuit 200 detects the standard synchronizing signals and provides the appropriate sampling and gating signals on lead 201 to A/D converter 110 so that only the active picture portion of analog input 101 is passed to pixel generator 120. Generator 120 operates on the sampled output from converter 110 appearing on lead 111. Typically, generator 120 quantizes the digitized signal and then provides a digital representation, for a fixed time period called a pixel, of the sampled signal. If eight bits are used to represent a pixel, then the sampled signal is quantized to one of 256 possible levels. Pixel generator 120 also receives its timing information from recovery circuit 200 via lead 201. Lead 121 then carries the serial stream of pixels representing the active video. Pixel selector 140 receives the pixel stream and, with output generator 210 deactivated, passes the pixel stream to memory 150 via lead 141.

In system 100, memory 150 is a dual-port RAM that, for example, is of sufficient size to store the pixels of a complete television (TV) frame, that is, two interleaved fields. Addressing information to store the stream of pixels arriving on lead 141 is derived from timing signal 201; the pixels are usually stored sequentially, say from a low to a high address. Pixels from an incoming video frame overwrite the previously stored pixels representative of the earlier frame.

Upon activation of output generator 210, an analog video output signal is generated from the pixels stored in memory 150 with a resulting reconstructed video signal appearing on lead 191. The activation signal to generator 210 is received over lead 213; this signal is generally uncorrelated or unsynchronized (hereinafter the term unsynchronized also includes signals of the same frequency or period but having different phases); to the incoming video signal appearing on lead 101. It follows that the output of generator 210 is also unsynchronized with the input video signal. Thus, for example, a camera scanning a field of view produces the video signal appearing on lead 101. A monitor (not shown) is used to display this view, but since the monitor is presumed to be time-shared, the views from other video cameras (not shown) are displayed on this single monitor. The signal on lead 213 indicates that the monitor is ready to display the view stored in memory 150 as produced by the camera feeding lead 101. To obtain data to generate the output video signal on lead 191, pixel data representative of each horizontal line from the field are sequentially read from the output port of memory 150; illustratively, these pixels are read from a low to a high address location in memory 150 and the pixels appear on lead 151. Address and timing information to control the selection of the pixels is provided to memory 150 from generator 210 via lead 211. Transfer logic circuit 160 receives the serially produced pixels and gates these pixels to output buffer 170. Buffer 170 is typically of sufficient size to hold the requisite number of pixels to generate one horizontal line. For instance, transfer logic 160 typically performs a parallel load into buffer 170; this transfer takes, illustratively, 0.25 microseconds. Output buffer 170 unloads this parallel word, typically at least 256 bits, in 25 or 50 microseconds as a serial output stream on lead 171. D/A (digital-to-analog) converter 180 generates an analog representation of the contents of buffer 170 as the contents appear sequentially on lead 171. Video generator 190 receives the horizontal and vertical timing information, on leads 211 and 212, respectively, from timing generator 210 as well as the signals arriving on lead 181 from D/A converter 180 and consequently reconstructs the complete output video signal on lead 191.

Figure 2:
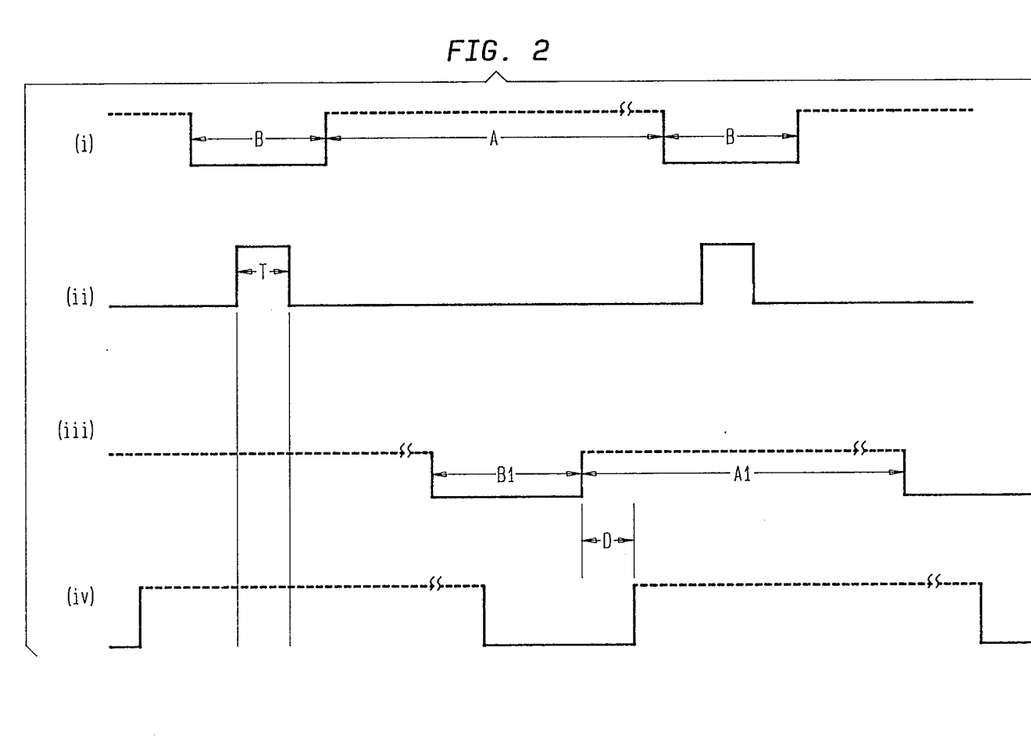
FIG. 2 is a signal diagram depicting the timing of certain signals in the circuit of FIG. 1.

The timing and the flow of pixel data through circuits 150-170 shown in FIG. 1 are depicted by the timing diagram of FIG. 2. The reader should refer to both FIGS. 1 and 2 throughout the following discussion. With reference to line (i) of FIG. 2, the active portion (A) of the video output signal, corresponding to a single horizontal TV line, is shown between two horizontal blanking signals (B). To obtain the pixel data to generate the active analog signal for delivery to output lead 191, a data-read signal of duration T represented by line (ii) of FIG. 2 gates the pixel data representative of the active portion of the horizontal TV sweep to output buffer 170 during each blanking interval. All the pixel data needed to generate one horizontal line is read out during the duration T. Because of the dual port nature of memory 150, it cannot be simultaneously written into and read from the memory. Thus, as memory 150 is being read at its output port, some accommodation is required at its input port to capture those pixels being continuously generated by generator 120. This is accomplished in accordance with one embodiment of the present invention by interposing pixel delay circuit 130 between generator 120 and selector 140. In broad terms, pixels produced by generator 120 are diverted through delay circuit 130 and appear at a second input to selector 140 via lead (diversion path) 131. Circuits 130 and 140 are arranged so that the pixels from generator 120 are delayed by a preselected duration (D in FIG. 2) whenever the output port of memory 150 is activated. Also, sequential addressing for the storage of input pixels into memory 150 is inhibited during the output data transfer time since addresses and pixels must remain aligned. Once the output read is completed, data write to the input port is reactivated and the appropriately delayed pixels arrive sequentially through the diversion path.

The effect of the delay is shown by comparing lines (iii) and (iv) of FIG. 2. The signal on line (iii) is the basic incoming video signal appearing on lead 101 wherein B1 represents the horizontal blanking interval and A1 is the active video portion. The signals on lines (i) and (iii) are commensurate, the primary difference being that they are unsynchronized. Line (iv) merely depicts the signal on line (iii) is delayed by duration D. In practice, duration D is substantially equal to time interval T. For example, if it is assumed that a data transfer time T is equal to the time needed to generate two pixels, then illustratively pixel delay circuit 130 is a shift register which stores two pixels.

Figure 3:
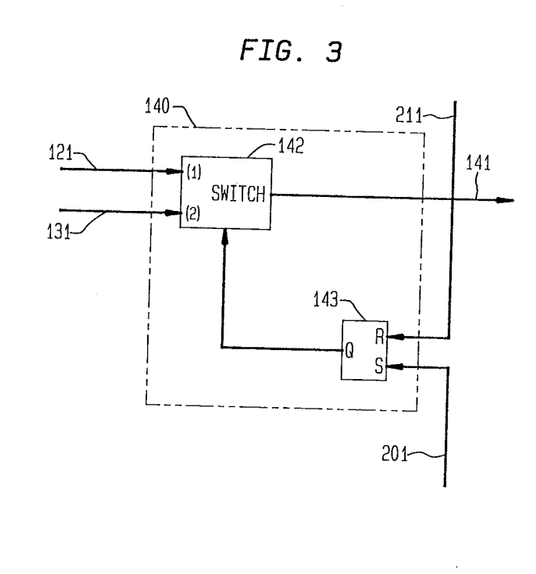
FIG. 3 is one embodiment of pixel selector circuit 140 shown in FIG. 1.

One illustrative embodiment of pixel selector 140 is shown in FIG. 3. In this embodiment, whenever a data transfer occurs at the output of memory 150, switch 142 switches from lead 121 to lead 131 under control of S/R (set/reset) flip-flop 143. When the data transfer is complete, the data presented to memory 150 is now delayed by the time required to effect a data transfer, so no pixel data is lost. When each horizontal line of the input video signal is finished and input blanking starts, switch 142 is reset by the action of flip-flop 143. The overall result is that the input picture can be interrupted by the output picture at any time, as long as it is only once per TV line as presumed in the foregoing discussion with reference to FIGS. 1-3.

The description of FIGS. 1-3 has been couched in terms of processing an input TV signal to generate an output TV signal having a different time base than the input signal. Those skilled in the art will readily appreciate that this description and the associated circuitry of FIGS. 1 and 3 are merely illustrative of the general principles of the present invention, namely, that an input data stream derived from or referenced to an input timing signal may be converted to an output data stream referenced to an output timing signal through interposed delay circuitry and a dual-port memory configuration. In general, the input and output timing signals are unsynchronized.

Figure 4:
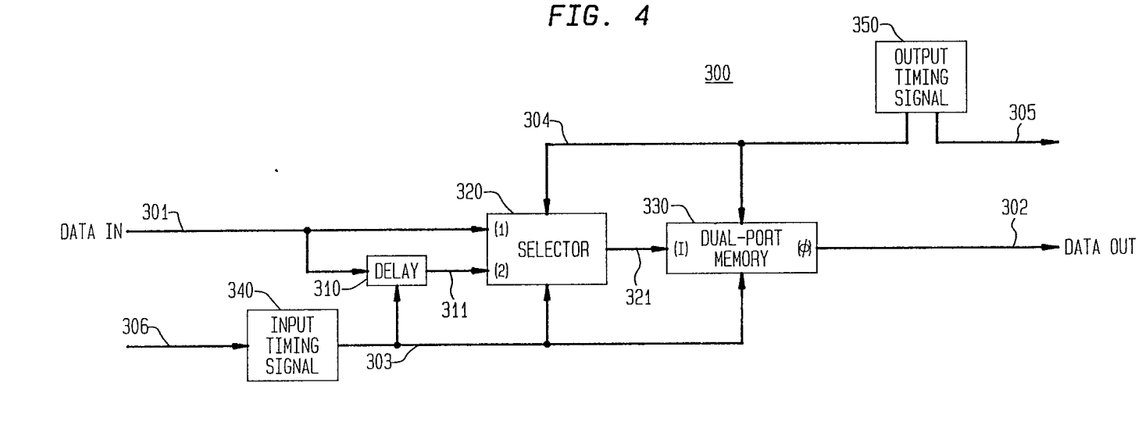
FIG. 4 is a block diagram of general data processing circuitry fabricated in accordance with the present invention.

With reference to FIG. 4, there is shown block diagram 300 in accordance with the general principles of the present invention. An input data stream appears on lead 301, whereas an output data stream is transmitted on lead 302. The input data stream is communicated during each A1 interval as depicted on line (iii) of FIG. 2. The complete input stream, represented by both the A1 and B1 intervals on line (iii) of FIG. 2, serves as the input, via lead 306, to input timing signal circuit 340. Front-end circuitry (not shown) has presumably stripped the input data portion from the input stream and now transmits the data portion to system 300 via lead 301; the front-end circuitry is not central to the inventive subject matter. The output data stream is emitted during each A interval as depicted on line (i) of FIG. 2. The output data stream, when combined in back-end circuitry (not shown) with a timing signal available on lead 305, form the concatenated output stream as represented by line (i) of FIG. 2; the back-end circuitry is also not central to the inventive subject matter.

Delay circuit 310 receives the input data stream arriving on lead 301 and outputs a delayed version of the input data stream on lead 311 under control of input timing signal circuit 340. Selector 320 has the data streams appearing on leads 301 and 311, namely, the input data stream and the delayed input data stream as inputs. Selector 320 is essentially a two-position device having selector positions designated (1) and (2) as depicted by these indicia in the block representing this selector. When in position (1), the input data stream is passed through selector 320 to lead 321, whereas in position (2) the delayed version of the input data stream is passed through to lead 321. Both the input timing signal (as depicted by line (iii) of FIG. 2) appearing on lead 303 and the output timing signal (as depicted by line (ii) of FIG. 2), derived from output timing signal circuit 350 and appearing on lead 304, also serve as inputs to selector 320. Output circuit 350 also provides an output reference signal (as depicted by line (i) of FIG. 2), via lead 305, so the output stream may be generated from the output stream appearing on lead 302.

The input port (I) of dual-port memory 330 initially receives the input data stream via the path comprising lead 301, selector position (1) of selector 320 and lead 321. However, once memory 330 receives a request, via lead 304, to write the output data stream onto lead 302 from the output port (0), selector 320 is also notified via lead 304 to switch to selector position (2). As soon as the input port is again activated to read from lead 321, the data appearing at the input port is the delayed version of the input, so no input data is lost due to an interrupt to process the output write request during the reading of the input data stream. Again this presumes that the delay interval provided by delay means 310 is matched to the duration required to transfer the output data stream to lead 302. Once the data portion for a given input stream is completely stored, selector 310 is reset to position (1) so that during the initial portion of the next read interval by memory 330, the input port receives the input data stream. Thus, as long as there are timing (e.g. blanking or reset) intervals in the input and output streams, the circuitry as exemplified by block diagram 300 may be used to reconstruct output data from input data even though the input and output streams are out-of-phase.

As above in the TV illustrative embodiment, delay means 310 may be a shift register and selector means 320 may be a combination of a switch and flip-flop as discussed earlier with reference to FIG. 3. Also, dual-port memory means 330 may be composed of a cascade combination of a dual-port memory device, a transfer logic circuit and an output buffer storage memory all in a single integrated circuit package; this cascade combination is substantially the same as the serial arrangement of memory 150, transfer logic 160 and output buffer memory 170 described with reference to FIG. 1.

Figure 5:
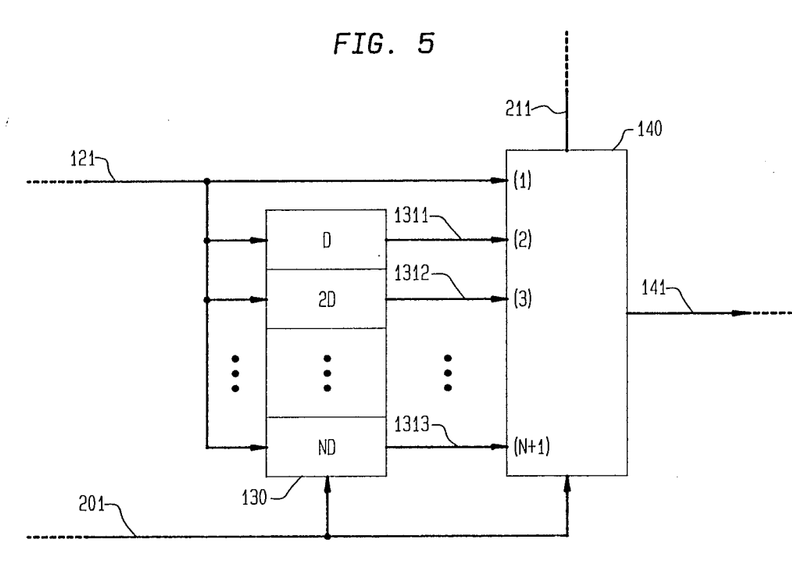
FIG. 5 is a block diagram of a combined pixel delay, pixel selector arrangement for the general care of N transfers per cycle.

Also, one of ordinary skill in the art may now readily appreciate other modifications and enhancements to FIGS. 1-4 in accordance with the principles of this invention. For instance, if there are N transfers per cycle (N>2 but relatively small), then the circuitry of FIG. 5 can effect these N transfers. In FIG. 5, pixel delay circuit 130 comprises N delay paths operating in parallel. Each path has the same input but a separate output. Delay circuit 130 couples to pixel selector 140, which now has (N+1) selector positions. The first position terminates the pixel stream on lead 121 without any interposed delay. The second position terminates the pixel stream on lead 1311 emanating from delay circuit 130; the stream on lead 1311 has a delay of D. Similarly, the third position terminates the pixel stream on lead 1312 with a delay of 2D. Finally, position (N+1) terminates the pixel stream on lead 1313 with a delay of ND. Alternatively, the shift register can be N sections long, with each section being length D, and have N or N>1 taps.

With this combined arrangement, after each transfer interruption in a cycle, the stream corresponding to the cumulative number of transfers in the cycle is available to selector 140.

It is further understood that the circuitry described herein is not limited to the specific forms shown by way of illustration, but may assume other embodiments limited only by the scope of the appended claims.

What is claimed is:

1. Circuitry for generating an output data stream in response to an output timing signal from an input data stream referenced to an input timing signal, wherein the input and output timing signals are unsynchronized, the circuitry comprising:

delay means responsive to the input data stream and the input timing signal to produce a delayed data stream;

selector means coupled to said delay means and responsive to the input data stream, the input timing signal and the output timing signal; and dual-port memory means having an input port coupled to said selector means and having an output port for emitting the output data stream, said memory means being responsive to the input timing signal and the output timing signal, wherein said selector means is initially set to a first position to provide the input data stream to said input port, and said selector means provides said delayed data stream to said input port whenever said selector means is set to a second position by the output timing signal, and wherein the output data stream is emitted from said output port upon detection of the output timing signal by said memory means.

2. The circuitry as recited in claim 1 wherein said selector means is reset to said first position upon storage of the data in said delayed data stream by said memory means.

3. The circuitry as recited in claim 1 wherein said delay means is a shift register.

4. The circuitry as recited in claim 1 wherein said selector comprises:
a two-position switch having the input data stream and said delayed data stream as inputs and having its output connected to said memory means; and
a flip-flop having the input timing signal and the output timing signal as inputs and having its output connected to said switch,
wherein the input timing signal sets and the output timing signal resets said flip-flop.

5. The memory as recited in claim 1 wherein said dual-port memory means comprises:
a dual-port memory device having a local input port and a local output port with said local input port serving as said input port, said device responsive to the input timing signal;
a transfer logic circuit connected to said local output port and responsive to the output timing signal; and
buffer storage memory means connected at its input to said transfer logic circuit and responsive to the output timing signal and having an output serving as said output port,
wherein, upon detection of the output timing signal, said buffer storage memory means emits the output data stream and said transfer logic circuit transfers the next succeeding output data stream from said dual-port device to said buffer means.

6. A method for controlling a dual-port memory to generate an output data stream in response to an output timing signal from an input data stream referenced to an input timing signal, wherein the input and output timing signals are generally unsynchronized, the method comprising the steps of:
(a) delaying the input data stream to produce a delayed data stream;
(b) initially connecting an input port of the memory to the input data stream for storage of the input data stream in the memory;
(c) upon detection of the output timing signal by the memory, activating an output port of the memory to emit the output data stream and deactivating said input port; and
(d) upon termination of the output timing signal, reactivating said input port and connecting said input port to said delayed data stream for storage of said delayed data stream in the memory.

7. The method as recited in claim 6 wherein the input timing signal and the output timing signal are periodic and said steps (a)–(d) are sequentially repeated in response to the input and output signals to produce a continuous output data stream from a continuous input data stream.

8. Circuitry for generating output samples referenced to an output timing signal from input samples referenced to an input timing signal, the circuitry comprising:
means, responsive to the input timing signal, for delaying the input samples to produce delayed samples;
means, coupled to said means for delaying and responsive to the input timing signal and the output timing signal, for selecting between the input samples and said delayed samples; and
a dual-port memory having an input port connected to said means for selecting and an output port for emitting the output samples, said memory being responsive to the input timing signal and the output timing signal,
wherein said means for selecting initially routes the input samples to said input port and, upon detection of the output timing signal, said means for selecting routes said delayed samples to said input port, and
wherein the output samples are emitted from said output port upon detection of the output timing signal.

9. The circuitry as recited in claim 8 wherein said means for selecting is reset to route the input samples to said input port upon storage of said delayed samples in said memory.

10. The circuitry as recited in claim 8 wherein said means for delaying is a shift register.

11. The circuitry as recited in claim 8 wherein said means for selecting comprises:
a two-position switch having the input samples and said delayed samples as inputs and having its output connected to said dual-port memory; and
a flip-flop having the input timing signal and the output timing signal as inputs and having its output connected to said switch,
wherein the input timing signal sets and the output timing signal resets said flip-flop.

12. Circuitry for generating a video output signal from a video input signal in response to a control signal, wherein the video input signal and video output signal are unsynchronized, the circuitry comprising:
means for recovering the input horizontal and vertical timing signals conveyed by the video input signal;
output timing means, responsive to the control signal, for generating output horizontal and vertical timing signals a data transfer signal during each output horizontal blanking interval in order to reproduce the video output signal;
means, coupled to the means for recovering, for generating digital samples representative of the active portion of the video input signal;
means, coupled to the means for generating and said means for recovering, for delaying said digital samples to produce delayed digital samples;
means, coupled to said means for generating, said means for delaying, said means for recovering and said output timing means, for selecting between said digital samples and said delayed digital samples to produce selected samples;

a dual-port memory having an input port coupled to said means for selecting and an output port, said memory being responsive to said means for recovering and said output timing means and wherein said memory stores said selected samples to produced stored samples;

transfer logic means, coupled to said output timing means and said output port, for extracting predetermined ones of said stored samples under control of said data transfer signal;

buffer means, coupled to said transfer logic means and responsive to said output timing means, for storing said predetermined ones of said samples to produce output samples; and means, coupled to said buffer means and said output timing means, for reconstructing said video output signal from said output samples, wherein said means for selecting selects samples from said means for generating before the generation of said data transfer signal and said means for selecting selects samples from said means for delaying for the duration of the active portion of the video input signal delayed by the time required for said data transfer.

13. The circuitry as recited in claim 12 wherein said means for delaying is a shift register.

14. The circuitry as recited in claim 12 wherein said means for selecting comprises:

a two-position switch having said digital samples and said delayed digital samples as inputs and having its output connected to said dual-port memory; and a flip-flop having said means for recovering and said output timing means as inputs and having its output connected to said switch.

15. Circuitry for generating an output data stream in response to an output timing signal from an input data stream referenced to an input timing signal, wherein the input and output timing signals are unsynchronized, the circuitry comprising:

delay means responsive to the input data stream and the input timing signal to produce a plurality of data streams, each of said streams being delayed by a preselected duration;

selector means coupled to said delay means and responsive to the input data stream, the input timing signal and the output timing signal; and dual-port memory means having an input port coupled to said selector means and having an output port for emitting the output data stream, said memory means being responsive to the input timing signal and the output timing signal, said selector means further including a number of selector positions in correspondence to said plurality of data streams, with said selector means arranged to provide a selected one of said delayed data streams to said input port in response to said output timing signal, and wherein the output data stream is emitted from said output port upon detection of the output timing signal by said memory means.

16. The circuitry as recited in claim 15 wherein there are N of said data streams delayed by factors of D, 2D, ..., ND, respectively, and said number of selector positions is (N+1) with the first of said selector positions terminating the input data stream and each of the remaining N selector positions terminating each of said N data streams, respectively.

* * * * *